MICROWAVE FREQUENCY DISCRIMINATOR USING A CAVITY RESONATOR

Filed Nov. 4, 1963 3 Sheets-Sheet 1

INVENTOR.
HENRY J. RIBLET
BY Weingarten,
Orenbuch, &
Pandiscio
ATTORNEYS

July 26, 1966 H. J. RIBLET 3,263,176

MICROWAVE FREQUENCY DISCRIMINATOR USING A CAVITY RESONATOR

Filed Nov. 4, 1963 3 Sheets-Sheet 2

INVENTOR.
HENRY J. RIBLET

BY Weingarten, Orenbuch, & Pandiscio
ATTORNEYS

INVENTOR.
HENRY J. RIBLET
BY Weingarten, Orenbuch, & Pandiscio
ATTORNEYS

United States Patent Office 3,263,176
Patented July 26, 1966

3,263,176

MICROWAVE FREQUENCY DISCRIMINATOR USING A CAVITY RESONATOR

Henry J. Riblet, 35 Edmunds Road, Wellesley, Mass.

Filed Nov. 4, 1963, Ser. No. 321,029
4 Claims. (Cl. 329—116)

The present invention relates in general to frequency sensitive microwave apparatus and more particularly to an intrinsically balanced microwave discriminator providing an electrical signal proportional to the frequency deviation of the input signal from the frequency of a precision reference frequency device. The invention employs a mechanism which permits the reference frequency $f_0$ to be varied and the invention is so constructed that the necessity of having an apparatus which must be rebalanced or adjusted as the frequency of operation is varied is eliminated.

Frequency discriminators of various designs are well known in the electronic art. In general, the principle of operation most commonly employed in prior discriminators requires the incident radiation whose frequency deviation is to be measured to be divided between two radio frequency transmission paths. The two transmission paths introduce phase shifts which vary with frequency in a different manner for each path. In this way, a frequency dependent phase shift between the two signal transmission paths is established. By employing a phase sensitive detector in each of the signal transmission paths, an output dependent upon the relative phase shift is obtained. A typical frequency discriminator employing this principle of operation is described in Patent No. 2,041,855, issued May 26, 1936 to R. S. Ohl. An improved frequency discriminator utilizing the principle of operation is the Foster-Seeley discriminator, which has been extensively described in the technical literature. Frequency discriminators of the Ohl and Foster-Seeley types are, in essence, balanced phase detectors and are sometimes termed "phase discriminators."

A second type of discriminator that is widely known employs two tuned circuits, the resonant frequency of one circuit lying above the reference frequency and the resonant frequency of the other circuit lying below the reference frequency. When both of those resonant circuits are simultaneously excited by an input signal, the difference between the detected excitation in the separate circuits is indicative of the frequency deviation of the input signal from the reference frequency. This type of discriminator is known as a staggered-tuned discriminator.

Both the phase discriminator and the staggered-tuned discriminator have been made in forms suitable for microwave frequencies. The phase detector type of discriminator has been described by L. C. Rideout in a paper published in the Proceedings of the IRE of August 1947 on page 767. The device disclosed by Rideout employs a phase adjustment to obtain the proper phase relationship between the signals in the two separate transmission paths, one path being essentially a broadband circuit and the other path being a narrowband circuit whose phase and amplitude transmission characteristics are determined by a high-Q resonant cavity. Thus, where it is desired to operate the phase discriminator of Rideout at different frequencies, a separate phase adjustment has to be made at each different frequency in order to obtain the proper discriminator signal.

A staggered-tuned discriminator designed to be used at microwave frequencies is disclosed in Patent No. 2,502,456, issued to W. W. Hansen. That patent discloses the use of a dual-mode cavity resonator to stabilize the frequency of the microwave source. Dual-mode cavities are inherently complex devices, difficult to design and costly to build, and consequently, the utilization of dual-mode cavities has been restricted to specialized equipment where no suitable, less costly, alternative apparatus is available.

The difficulties and disadvantages associtaed with the foregoing types of microwave discriminators are overcome by the invention here disclosed. A device constructed in accordance with the invention, inherently provides the proper phase relationship by the geometry of the actual microwave circuitry so that no phase adjustment is necessary when the reference frequency of the discriminator is changed.

In this invention, the input microwave energy is equally divided between two parallel microwave transmission paths. A tunable cavity resonator is employed as the device which determines the reference frequency $f_0$. The cavity resonator is coupled in equal degree to the two parallel microwave transmission paths in a manner such that the wave energy in one of the transmission paths appears to the cavity resonator to be shifted 90° with respect to the wave energy in the other transmission paths. Where the input signal frequency is at the resonant frequency of the cavity, the cavity does not alter the phase relation of the microwave energy in the two parallel transmission paths. However, if the input signal frequency is above resonance, the phase relation of the microwave energy in the two transmission paths is altered in one direction whereas if the input signal frequency is below resonance, the phase relation is altered in the opposite direction.

The invention, both as to its construction and manner of operation, can be better understood from a perusal of the following exposition when considered together with the accompanying drawings in which.

Figure 1:
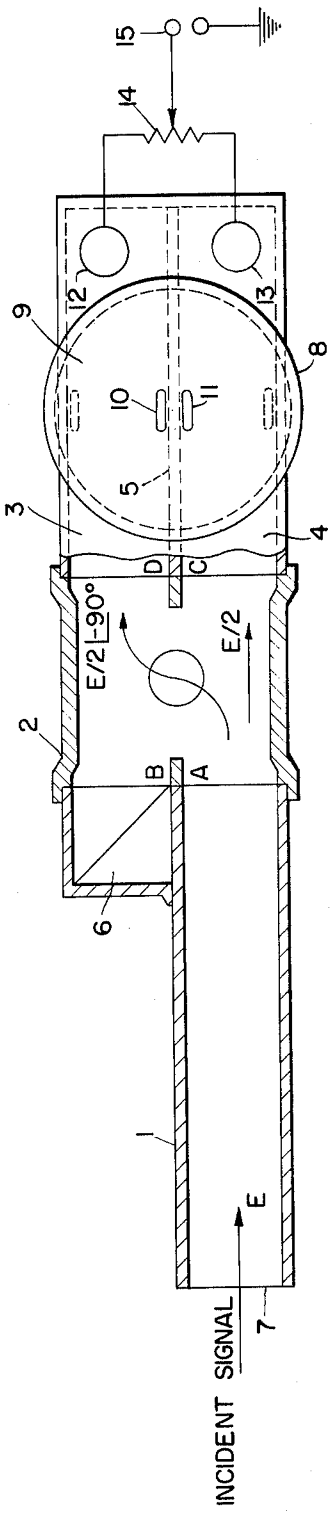
FIG. 1 depicts the scheme of a preferred embodiment of the invention employing a power dividing 90° phase shift coupler.

Referring now to FIG. 1, there is depicted a frequency discriminator having a section of waveguide 1 coupled by a 90° phase shift power dividing coupler 2 to a pair of adjacent parallel transmission channels 3 and 4. Transmission channels 3 and 4 are preferably waveguides although they may be coaxial lines or some other type of transmission apparatus capable of supporting and guiding propagation of the frequencies involved. As indicated in FIG. 1, transmission channels 3 and 4 are formed by a single rectangular pipe having an internal partition 5 constituting a common sidewall dividing the pipe into two waveguides.

Power dividing coupler 2 may be of the type known as the "short slot hybrid." Any quadrature hybrid coupler may be used, however, and where the transmission channels are coaxial lines a strip line hybrid coupler such as is described by B. M. Oliver in his article entitled "Directional Electromagnetic Couplers," Proc. IRE, vol. 42, November 1954, pp. 1682–1692, would serve the purpose. The construction and characteristics of the short slot hybrid are set forth in my patents Serial No. 2,739,287 and Serial No. 2,739,288. It is characteristic of the short slot hybrid coupler, as it is of any quadrature hybrid, that energy applied to one of the input arms is equally divided between the two output arms with substantially complete isolation of the opposite input arm. Usually the opposite input arm is terminated in a load to absorb any energy that may enter that arm. In FIG. 1, the opposite input arm B of coupler 2 is terminated by load 6, and the output arms C and D are connected to transmission channels 3 and 4. Microwave energy incident upon the input port 7 of waveguide section 1, enters input arm A of the short slot hybrid coupler and divides equally so that the voltages of the wave energy emerging from the output arms and entering transmission channels 3 and 4 are equal in amplitude and differ in phase by 90°.

Figure 2:
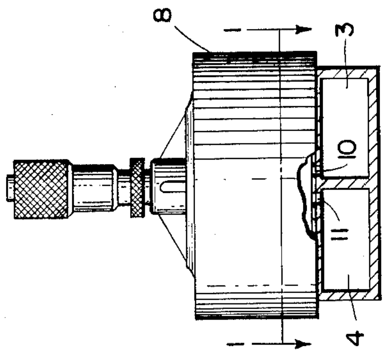
FIG. 2 is a view of the preferred embodiment showing the slots coupling the cavity resonator to the transmission channels.

A cylindrical cavity resonator 8, best shown in FIG. 2, has its fixed end wall 9 secured on the upper broad wall of waveguides 3 and 4. Preferably the cavity resonator is of the circular cylinder type that is tunable through the range of frequencies in which $f_0$, the center frequency of the discriminator, may be required to be set. Where the discriminator is to be used with a fixed $f_0$, the cavity resonator, of course, need not be of the tunable type. Transmission channels 3 and 4 are coupled to the $TE_{11}$ mode in the cylindrical cavity by coupling slots 10 and 11, as indicated in FIGS. 1 and 2.

A pair of microwave detectors 12 and 13 are disposed adjacent the short-circuited termination of the waveguide transmission channels. The detectors, preferably, are semiconductor diodes and are arranged so that the rectified voltages are impressed as signals of opposite polarity on a simple summing circuit. That is, the detectors are arranged to be sensitive to signals of opposite polarity so that if detector 12, for example, detects the positive peaks of microwave energy incident on it, detector 13 is arranged to detect the negative peaks of the waves incident on it. The summing circuit may simply consist of a potentiometer 14 having its movable arm connected to output terminal 15.

Before proceeding with an explanation of the operation of the novel discriminator, it should be observed that two voltages which are of equal magnitude but differ in phase by 90°, can each be deemed to be the resultant of a voltage $E_e$ and a voltage $E_o$. Consider, for example, the two voltages, represented as vectors in FIG. 3, in the waveguides 3 and 4, the voltages differing in phase by 90°. Each voltage is the resultant of a voltage $E_e$ and a voltage $E_o$. The voltages $E_e$ in the two waveguides are equal in amplitude and have the same phase whereas the voltages $E_o$ in the two guides are seen to be of equal amplitude but are 180° out of phase. In addition, it is evident that where the amplitude of $E_e$ is equal to the amplitude of $E_o$, the magnitude of the resultant is $E\sqrt{2}$.

With the foregoing in mind, the operation of the novel microwave discriminator will now be explained. Microwave energy incident upon input port 7 of waveguide 1 proceeds through input arm A into coupler 2. The energy entering the coupler is divided into two equal portions which emerge from output arms C and D equal in voltage, the energy leaving arm D being in phase quadrature with respect to the energy leaving arm C. The energy leaving output arm C is designated $E/2$ whereas the energy leaving output arm D is designated $E/2\underline{|-90°}$ to indicate that it differs in phase by 90° from the energy in output arm C. The wave energies $E/2$ and $E/2\underline{|-90°}$ from the coupler's output arms propagate into transmission channels 3 and 4 and are coupled by slots 10 and 11 to the cavity resonator 8. The slots 10 and 11 are arranged so that only in-phase voltages across the slots couple to the $TE_{11}$ mode in the cavity resonator. The electric field configuration of the $TE_{11}$ mode in the resonant cavity is depicted in FIG. 4.

Figure 4:
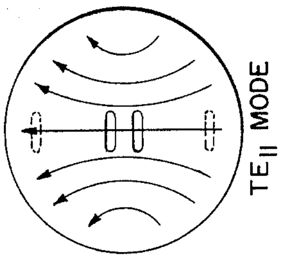
FIG. 4 shows the electric field configuration of the $TE_{11}$ mode in a cylindrical cavity resonator.
Figure 3:
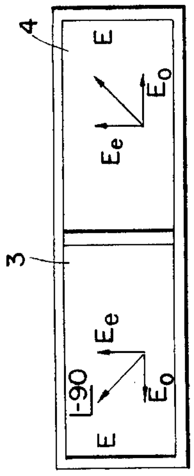
FIG. 3 is a vector diagram of voltages existing in the transmission channels.

From FIGS. 3 and 4 it can be deduced that the voltages $E_e$ only excite out-of-phase voltages at slots 10 and 11, whereas voltages $E_o$ excite in-phase voltages across the slots. Energy in the $TE_{11}$ mode in the resonant cavity is therefore coupled only to the $E_o$ voltage components of the wave energy in transmission channels 3 and 4.

Where the frequency of the input signal E, applied at port 7 of waveguide 1, is the resonant frequency of cavity 8, the resultant wave energies in transmission channels 3 and 4, after passing slots 10 and 11 and proceeding toward detectors 12 and 13 are represented by the vector $R_3$ of FIG. 5A and the vector $R_4$ of FIG. 5B. The voltage component $E_o$ may be reduced somewhat in magnitude in both transmission channels due to absorption of energy by the resonant cavity, but the resultant voltages $R_3$ and $R_4$ in both transmission channels will have the same magnitude.

Where the input signal is not at the cavity's resonant frequency, the resultant voltages $R_3$ and $R_4$ will be either as shown in FIGS. 5C and 5D or as in FIGS. 5E and 5F. When the frequency of the input signal is other than at the resonant frequency of the cavity, the phase of the voltage component $E_o$, in both transmission channels is shifted with respect to voltage component $E_e$ so that the resultant voltage $R_3$ is no longer equal to resultant voltage $R_4$. On one side of resonance the phase of $E_o$ is shifted in one direction with respect to $E_e$, whereas on the other side of resonance the phase of $E_o$ is shifted in the opposite direction. Because $E_o$ in transmission channel 3 is 180° out of phase with $E_o$ in transmission channel 4, the resultant voltages $R_3$ and $R_4$ are unequal when the input signal is not at the resonant frequency of the acvity. The magnitude of the voltage $e_o$ at terminal 15 therefore indicates the extent of the frequency deviation of the input signal from the resonant frequency $f_0$ of the cavity and the polarity of that voltage indicates whether the input signal frequency is above or below the frequency $f_0$. As the frequency of the input signal is swept through the resonant frequency of the cavity resonator, it is apparent that output $e_o$ at terminal 15 will follow the S-shaped discriminator curve familiar to those skilled in the electronic discriminator art.

Figure 8:
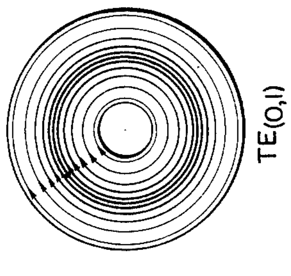
FIG. 8 depicts the electric field configuration of the $TE_{01}$ mode in a cylindrical cavity resonator.

It is an objective of the embodiment of FIG. 1 to establish at the slots which couple the transmission channels to the resonant cavity a voltage in one transmission channel that is in phase quadrature with respect to the voltage in the other transmission channel. This concept is again utilized in the embodiment depicted in FIG. 6. The input signal applied at input port 20 of waveguide 21 propagates into a power dividing section 22 and is split into two equal parts. The wave energies of the two parts entering transmission channels 23 and 24, therefore, are equal in amplitude and are in phase with respect to each other. Transmission channel 23 is coupled to a cylindrical cavity reasonator 25 by a slot 26 and transmission channel 24 is similarly coupled to the cavity resonator by slot 27. The slots are displaced by $\lambda g/4$ where $\lambda g$ is the wavelength in the guide at the resonant frequency of the cavity, $\lambda g/4$ being measured between the geometrical centers of the slots and parallel to the transmission line. The slots are arranged to couple into the $TE_{01}$ mode of the cylindrical cavity resonator. The electric field configuration of the $TE_{01}$ mode is depicted in FIG. 8 and it is apparent that the mode is circularly symmetrical. For coupling to the $TE_{01}$ mode, the voltages across slots 26 and 27 must have the phase relationship shown in FIG. 6 by the arrows traversing the slots.

Transmission channels 23 and 24, as in the embodiment of FIG. 1, are waveguides that are terminated by short circuits. Adjacent the terminations, a detector 28 or 29, is disposed in each waveguide. The outputs of the detectors are applied to a summing circuit 30 to provide an output voltage $e_o$ at terminal 31.

Figure 6:
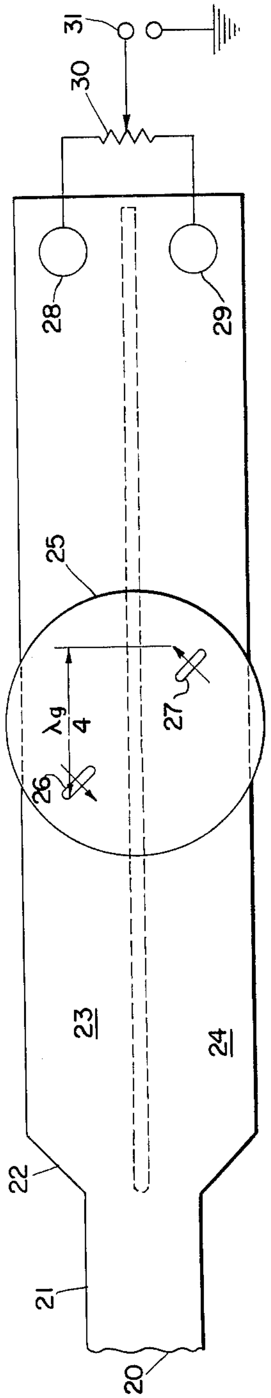
FIG. 6 shows the scheme of another embodiment of the invention.
Figure 7:
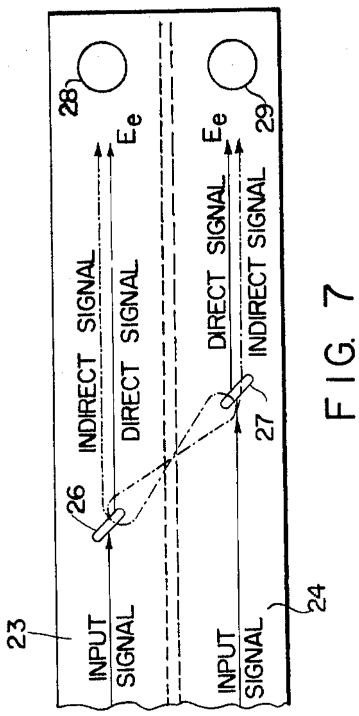
FIG. 7 depicts the paths of wave energy propagating in the discriminator of FIG. 6.

Referring now to FIG. 7 which depicts a portion of the discriminator of FIG. 6, wave energy, from the input signal, propagating in channel 24 toward detector 29, arrives at slot 27 where it splits into a signal continuing toward detector 29 and a signal which proceeds through slot 27 into the cavity and emerges from slot 26 with half of the emergent signal propagating toward detector 28 and the other half propagating back toward input port 20. A signal in channel 23 propagating from the input port toward detector 28 splits at slot 26 in a similar manner, with a portion proceeding directly toward detector 28 and a portion entering the cavity resonator through slot 26.

It should be borne in mind that a signal entering the resonant cavity through one coupling slot and emerging from the other slot encounters exactly 0 or 180° phase shift in the cavity resonator at resonance as all voltages and currents in the resonator must vary synchronously. Therefore, a signal at resonance entering the cavity resonator through one coupling slot, in effect, emerges simultaneously from the other coupling slot. A signal in transmission channel 24 that proceeds to detector 28 via coupling slots 27 and 26, travels an additional quarter wavelength compared with a signal which propagates directly along channel 23 to detector 28. As a corollary, a signal in transmission channel 23 which travels to detector 29 via coupling slots 26 and 27 has a path that is shorter by one quarter wavelength ($\lambda g/4$) than the path travelled by a signal propagating along channel 24 directly to detector 29.

Figure 5:
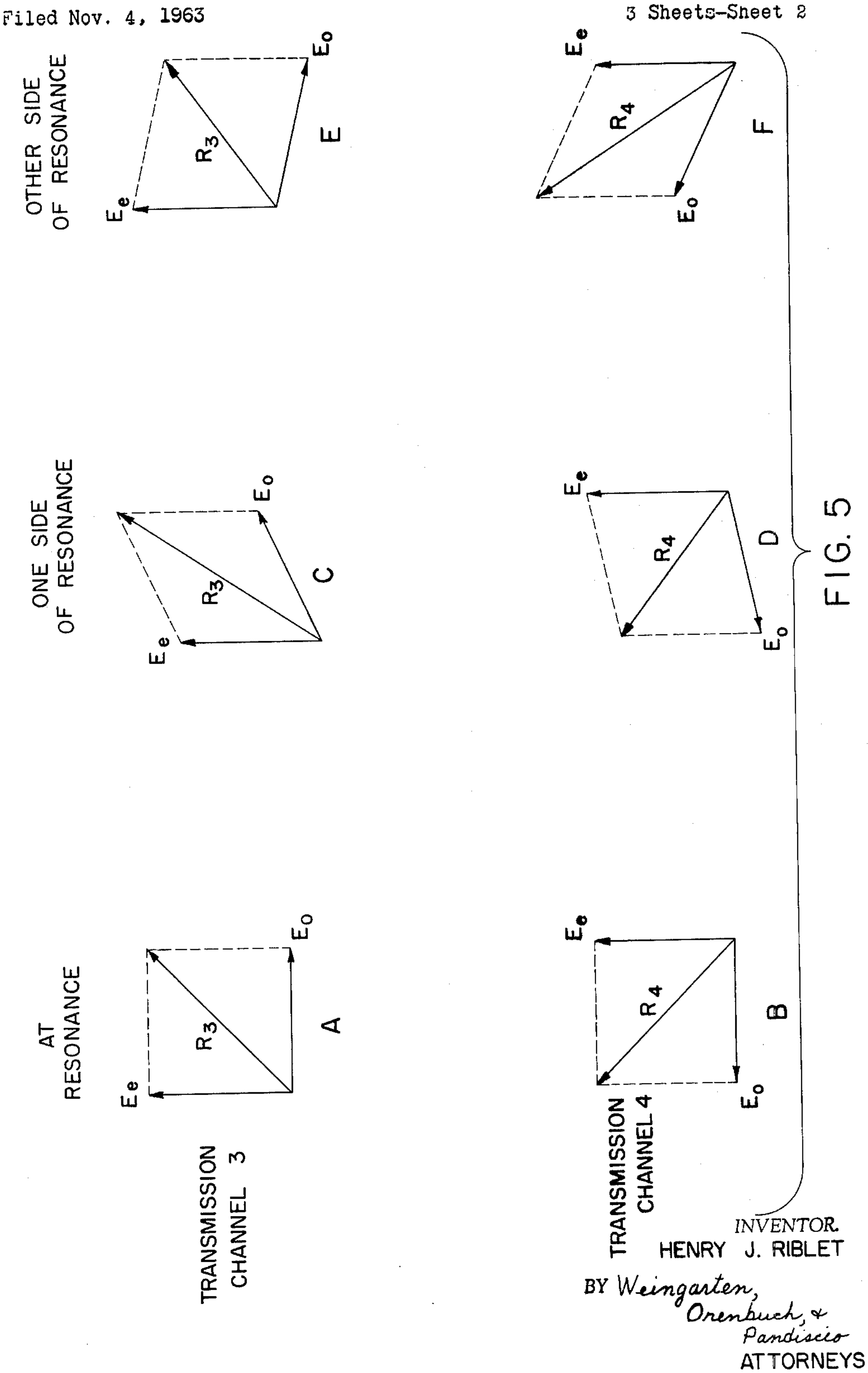
FIG. 5 is a vector diagram employed in the explanation of the operation of the preferred embodiment.

The resultant signals incident upon detectors 28 and 29 correspond to the resultants $R_3$ and $R_4$ depicted in FIG. 5. The voltage of the signal following the direct path to the detector in the transmission channel corresponds to vector $E_e$ and the voltage of the signal following the indirect path corresponds to the vector $E_o$. When the frequency of the input signal is the resonant frequency of the cavity resonator, the signals at the detectors are as represented by FIGS. 5A and 5B. Where the input signal frequency deviates to either side of the resonant frequency, the relative phase of the voltage $E_e$ is shifted with respect to voltage $E_o$. The net result is the same as in shown in FIGS. 5C, 5D, 5E, and 5F as can be appreciated by rotating those diagrams so that all $E_o$ vectors point in the same direction. The resultant voltage incident upon detector 28 is greater than the resultant voltage incident on detector 11 on side of resonance and is less than the resultant voltage at detector 11 on the other side of resonance. The frequency discriminator of FIG. 6, therefore, produces the familiar S-shaped curved when the input signal is swept through the discriminator's frequency range.

Mode configuration can exist in a resonant cavity such that currents in the cavity are 90° out of phase. Where a cavity employing such a mode configuration is employed in the embodiment of FIG. 6, the operation of the device remains unchanged if the coupling slots are positioned so that the voltages across them due to the input signal are in-phase as measured from the common input.

The concept underlying the invention is the utilization in the cavity resonator of a field configuration which excites fields in the coupling slots that have a relative phase difference 90° different from the relative phase of the fields in the coupling slots established by an input signal at the resonant frequency. For example, in FIG. 6, a field in resonator 25 would excite fields in slots 26 and 27 such that the fields have a 180° phase difference, whereas an input signal at the resonant frequency applied at port 20 establishes fields in slots 26 and 27 that have a relative phase of 90°. The difference between the relative phase of 180° in the slot fields excited by the resonator and the 90° relative phase of the slot fields established by the input signal is 90° and, therefore, accords with the inventive concept.

While two embodiments of the invention are depicted in the drawings, it is apparent to those familiar with microwave electronic apparatus that changes can be made which do not alter the nature of the invention. For example, the coupling slots 10 and 11 shown in full lines in FIG. 1 would be almost equally effective when placed as indicated by the broken line slots. As has been previously stated, the transmission channels may be coaxial lines rather than the illustrated waveguides. It is intended, therefore, that the invention not be restricted to the precise embodiments depicted, but rather that the scope of the invention be construed in accordance with the appended claims.

What is claimed is:

1. A microwave discriminator comprising:
means constituting two parallel wave energy transmission paths;
power dividing means for coupling an input signal to the two transmission paths;
a cavity resonator;
first and second means for respectively coupling each transmission path to the cavity resonator;
the cavity resonator having a configuration related to said first and second coupling means which excites fields in the first and second coupling means that have a relative phase difference 90° different from the relative phase of the respective fields established in the coupling means by an input signal whose frequency is the resonant frequency of the cavity;
and wave energy detectors in each transmission path for providing a detector of the relative energy difference therein.

2. A microwave discriminator comprising:
wave energy guides constituting two parallel transmission paths;
a coupler for dividing the power in an input signal equally between the two transmission paths;
a cavity resonator;
first and second coupling slots respectively coupling each transmission path to the cavity resonator;
the cavity resonator having a configuration related to said first and second coupling slots which excites fields in the coupling slots that have a relative phase difference 90° different from the relative phase of fields established in the coupling slots by an input signal whose frequency is the resonant frequency of the cavity;
and each transmission path having a means for detecting the wave energy therein for providing a detector of the relative energy difference in said paths.

3. A microwave discriminator comprising:
waveguides constituting two parallel wave energy transmission channels;
a power dividing 90° phase shift coupler arranged to couple an input signal to the two transmission channels;
a cavity resonator;
first and second slots for respectively coupling each transmission channel to the cavity resonator;
and each transmission channel having means for detecting the wave energy therein.

4. A microwave discriminator comprising:
a pair of waveguides providing two parallel wave energy transmission channels;
means for coupling an input signal to both transmission channels whereby the signal in one channel differs from the signal in the other channel only by its different phase;

a cavity resonator;

first and second slots coupling each transmission channel to the cavity resonator;

the cavity resonator having a configuration related to said slot coupling which excites fields in the coupling slots that have a relative phase difference 90° different from the relative phase established in the coupling slots by an input signal whose frequency is the resonant frequency of the cavity;

and a detector in each transmission channel for detecting the wave energy therein.

References Cited by the Examiner

UNITED STATES PATENTS

| | | | |
|---|---|---|---|
| 2,679,585 | 5/1954 | Drazy | 333—83 X |
| 2,886,705 | 5/1959 | Smith et al. | 329—116 |
| 3,077,565 | 2/1963 | Riblet | 329—116 |

ROY LAKE, *Primary Examiner.*

ALFRED L. BRODY, *Examiner.*